US012785139B2

(12) United States Patent
Finsy et al.

(10) Patent No.: US 12,785,139 B2
(45) Date of Patent: Nov. 3, 2026

(54) SULFIDE-BASED SOLID COMPOSITE ELECTROLYTE FILM

(71) Applicant: SYENSQO SA, Brussels (BE)

(72) Inventors: Vincent Finsy, Halle (BE); Fernand Gauthy, Wemmel (BE); Luca Merlo, Ixelles (BE); Marc-David Braida, Bry-sur-Marne (FR)

(73) Assignee: SYENSQO SA, Brussels (BE)

( * ) Notice: Subject to any disclaimer, the term of this patent is extended or adjusted under 35 U.S.C. 154(b) by 780 days.

(21) Appl. No.: 17/637,467

(22) PCT Filed: Jul. 21, 2020

(86) PCT No.: PCT/EP2020/070530
§ 371 (c)(1),
(2) Date: Feb. 23, 2022

(87) PCT Pub. No.: WO2021/043493
PCT Pub. Date: Mar. 11, 2021

(65) Prior Publication Data

US 2022/0278362 A1 Sep. 1, 2022

(30) Foreign Application Priority Data

Sep. 3, 2019 (EP) .................................... 19195191

(51) Int. Cl.
*H01M 10/0562* (2010.01)

(52) U.S. Cl.
CPC .................. *H01M 10/0562* (2013.01); *H01M 2300/0068* (2013.01); *H01M 2300/0091* (2013.01)

(58) Field of Classification Search
CPC .................. H01M 10/0562; H01M 2300/0068
See application file for complete search history.

(56) References Cited

U.S. PATENT DOCUMENTS

| | | | |
|---|---|---|---|
| 3,953,566 | A | 4/1976 | Gore |
| 4,110,392 | A | 8/1978 | Yamazaki |

(Continued)

FOREIGN PATENT DOCUMENTS

| | | | | | |
|---|---|---|---|---|---|
| CN | 105489931 | A * | 4/2016 | | ........ H01M 10/0525 |
| EP | 2091099 | A1 † | 8/2009 | | |
| JP | 2012199003 | A | 10/2012 | | |
| KR | 20170050562 | A | 5/2017 | | |
| WO | 18212568 | A1 | 11/2018 | | |
| WO | 19074074 | A1 | 4/2019 | | |

OTHER PUBLICATIONS

AoKeray, What are the FEP characteristics of polyfluoroethylene propylene (FEP)?, 2024: https://medicalptfe.com/what-are-the-fep-characteristics-of-polyfluoroethylene-propylene-fep/ (Year: 2024).*

(Continued)

*Primary Examiner* — Maria Laios
*Assistant Examiner* — Ziheng Lu
(74) *Attorney, Agent, or Firm* — Osha Bergman Watanabe & Burton LLP

(57) ABSTRACT

The present invention relates to a process for manufacturing a free-standing solid composite electrolyte film, comprising the steps of a) mixing (i) at least one sulfide-based solid ionic conducting inorganic particle and (ii) at least one tetrafluoroethylene (TFE) (co)polymer to form a paste and b) calendaring or extruding the paste to produce a film. The invention also relates to a free-standing solid composite electrolyte film comprising (i) at least one sulfide-based solid ionic conducting inorganic particle and (ii) at least one TFE (co)polymer, wherein an amount of the (ii) at least one TFE (co)polymer is from 1.0 to 20.0 wt %, preferably from 2.0 to 15.0 wt % and more preferably from 3.0 to 10.0 wt %, based on the total weight of the film.

9 Claims, 1 Drawing Sheet

(56) References Cited

U.S. PATENT DOCUMENTS

| | | | | |
|---|---|---|---|---|
| 9,300,011 | B2 | 3/2016 | Hama et al. | |
| 2004/0164440 | A1 † | 8/2004 | Ozaki | |
| 2005/0008936 | A1 * | 1/2005 | Takahashi | C01G 53/04 429/174 |
| 2006/0257744 | A1 * | 11/2006 | Burchardt | H01M 4/42 429/219 |
| 2008/0096061 | A1 * | 4/2008 | Burchardt | H01M 8/083 429/405 |
| 2013/0244135 | A1 * | 9/2013 | Yamane | H01M 8/1023 429/492 |
| 2014/0127570 | A1 * | 5/2014 | Dandrea | H01M 4/0435 264/105 |
| 2014/0238576 | A1 | 8/2014 | Zhong | |
| 2015/0062779 | A1 † | 3/2015 | Bankaitis | |
| 2015/0357672 | A1 | 12/2015 | Hong et al. | |
| 2016/0190640 | A1 * | 6/2016 | Visco | H01M 10/0525 429/322 |
| 2016/0336618 | A1 * | 11/2016 | Lee | H01M 10/0565 |
| 2017/0141430 | A1 | 5/2017 | Balsara et al. | |
| 2018/0166741 | A1 | 6/2018 | Xu et al. | |
| 2019/0372149 | A1 | 12/2019 | Cho et al. | |
| 2020/0227751 | A1 | 7/2020 | Mimura et al. | |

OTHER PUBLICATIONS

Quarti et al., "Ab Initio Calculation of the IR Spectrum of PTFE: Helical Symmetry and Defects", 2013, J. Phys. Chem. B, 117, 706-718, dx.doi.org/10.1021/jp3102145 (Year: 2013).*

Lee K., et al., "Selection of Binder and Solvent for Solution-Processed All-Solid-State Battery", Journal of The Electrochemical Society, 2017, 164(9), pp. A2075-A2081.

Riphaus, N., et al., "Slurry-Based Processing of Solid Electrolytes: A Comparative Binder Study", Journal of The Electrochemical Society, 165(16), 2018, pp. A3993-A3999.

Inada T. et al., "Fabrications and properties of composite solid-state electrolytes", Solid State lonics 158, 2003, pp. 275-280.

Hippauf F., et al., "Overcoming binder limitations of sheet-type solid-state cathodes using a solvent-free dry-film approach", Energy Storage Materials 21, 2019, pp. 390-398.

Moynihan, R.E., "The Molecular Structure of Perfluorocarbon Polymers. Infrared Studies on Polytetratluoroethylene" Journal of the American Chemical Society, 1958, vol. 81, pp. 1045-1050.

* cited by examiner
† cited by third party

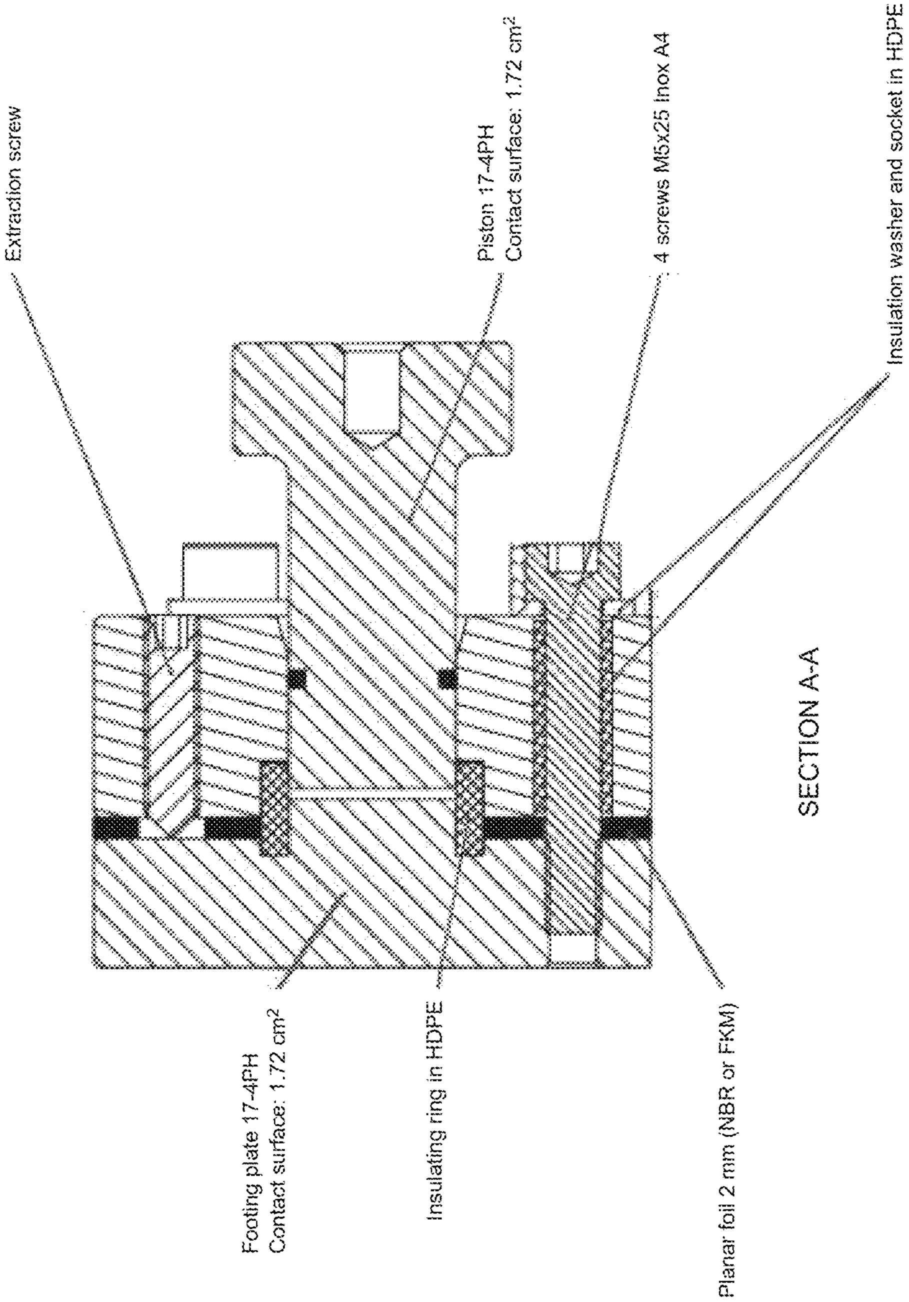
SECTION A-A

SULFIDE-BASED SOLID COMPOSITE ELECTROLYTE FILM

CROSS-REFERENCE TO RELATED APPLICATION

This application is a U.S. national stage entry under 35 U.S.C. § 371 of International Application No. PCT/EP2020/070530 filed Jul. 21, 2020, which claims priority to European patent application No. 19195191.2, filed on Sep. 3, 2019. The entire contents of these applications are explicitly incorporated herein by this reference.

TECHNICAL FIELD

The present invention relates to a process for manufacturing a free-standing solid composite electrolyte film, comprising the steps of a) mixing (i) at least one sulfide-based solid ionic conducting inorganic particle and (ii) at least one tetrafluoroethylene (TFE) polymer to form a paste and b) calendaring or extruding the paste to produce a film. The invention also relates to a free-standing solid composite electrolyte film comprising (i) at least one sulfide-based solid ionic conducting inorganic particle and (ii) at least one TFE polymer, wherein an amount of the (ii) at least one TFE polymer is from 1.0 to 20.0 wt %, preferably from 2.0 to 15.0 wt % and more preferably from 3.0 to 10.0 wt %, based on the total weight of the film.

TECHNICAL BACKGROUND

For more than two decades, Li-ion batteries have retained dominant position in the market of rechargeable energy storage devices due to their many benefits comprising light-weight, reasonable energy density and good cycle life. Nevertheless, current Li-ion batteries still suffer from poor safety and relatively low energy density with respect to the required energy density for high power applications such as electrical vehicles (EVs), hybrid electrical vehicles (HEVs), grid energy storage, etc. It is the presence of liquid electrolyte that is at the basis of such shortcomings.

In conventional Li-ion batteries, liquid electrolytes based on organic carbonates are mainly used so that Li-ion batteries are inherently prone to undergo leakage and generate volatile gaseous species, which are flammable.

Solid state batteries (SSB) are hence believed to be the next generation of energy storage devices, because they provide higher energy density and are safer than the conventional Li-ion batteries with liquid electrolyte system. In SSB, the highly flammable liquid electrolyte is replaced by a solid electrolyte so that all risk of ignition and/or explosion is to be substantially removed.

There are three types of solid electrolyte: (i) solid polymer electrolyte, (ii) inorganic electrolyte and (iii) composite electrolyte.

(i) Solid polymer electrolyte shows good mechanical properties and processability, but suffers from low ionic conductivity. State of the art polymeric conductor, for instance poly(ethyleneoxide) having high molecular weight, where Li salts are dissolved, suffers from two main drawbacks. First, due to the crystallinity of the polymer, sufficient conductivity can only be obtained at temperatures beyond its melting temperatures so that its applicability is limited to high temperature applications only. Secondly, such a solid polymer electrolyte is largely plasticized by the incorporation of salts, resulting in poor mechanical properties.

(ii) Inorganic electrolyte exhibits high ionic conductivity, but poor mechanical properties so that it's brittle. Oxide-based inorganic electrolytes such as the garnet type Li-ion conductive material, e.g., $Li_7La_3Zr_2O_{12}$ (LLZO), suffer from poor grain boundary conductivity. This is because Li-ion transport is largely hindered at the grain boundaries between the oxide inorganic particles and also at the interfaces between the solid electrolyte and electrodes. Accordingly, these materials rely on sintering processes in order to fuse the grains and subsequently construct a conductive pathway. Only hot pressing has been successful in reducing the sintering duration, but it requires specialized and costly equipment, which is a big obstacle for mass-production at commercial scales. Moreover, thin film formability by hot-pressing has not been demonstrated yet. To the contrary, sulfide-based inorganic electrolytes exhibit high conductivity of above $10^{-4}$ $Scm^{-1}$ at room temperature and the grain-to-grain contact resistance of sulfide particles may be easily removed by conventional cold pressing. Notably, neither sintering nor hot-pressing is necessarily required. Nevertheless, sulfide-based inorganic electrolytes remain brittle and thin film formability by cold pressing at commercial scale remains yet to be demonstrated.

(iii) Composite electrolytes, for instance those composed of sulfide particles dispersed into a polymeric matrix, offer the possibility to combine the high ionic conductivity of the inorganic electrolyte with the good mechanical properties and processability of the polymers. Hence, these composite electrolytes are considered as being the most promising solution at industrial scale.

Despite the fact that sulfide-based composite electrolytes offer the possibility to solve the drawbacks of other solid electrolytes, notably (composite) oxide electrolytes, and polymeric electrolytes with interesting ionic conductivity and mechanical property, several shortcomings, such as high solvent reactivity of the sulfide-based composite electrolyte remain to be overcome.

In other words, a sulfide-based solid composite electrolyte has been investigated as a solution, but it has been found that it's far more complex than expected to manipulate/engineer the surface chemistry of the polymeric binder and sulfide material within the sulfide-based composite electrolyte. Very poor solvent compatibility of sulfide-based solid electrolytes, which eventually restricts the selection of the binder, is the cause of this problem.

Accordingly, several attempts have been made to overcome the drawbacks of sulfide-based solid composite electrolytes.

Lee et al. in *Journal of The Electrochemical Society,* 164(9) A2075-A2081 (2017) ("Selection of Binder and Solvent for Solution-processed All-Solid-State-Battery") tried various combinations of solvent and binder and succeeded to attain about 0.4 $mScm^{-1}$ of ionic conductivity at room temperature with a solid composite electrolyte comprising $Li_3PS_4$ ($75Li_2S$-$25P_2S_5$), nitrile butadiene rubber (NBR) as binder and p-xylene as solvent.

LSPS ($Li_{10}SnP_2S_{12}$) composites with a range of non-conductive binders comprising polyisobutene (PIB), styrene butadiene rubber (SBR), poly(methyl methacrylate) (PMMA), poly(ethylene vinyl acetate) (PEVA) and hydrogenated nitrile butadiene rubber (HNBR) were also tried by Riphaus et al. in *Journal of the Electrochemical Society,* 165(16) A3993 A3999 (2018) ("Slurry-based Processing of Solid Electrolytes: A comparative Binder Study") to understand the impact of binder type on ionic conductivity and the minimum amount of binder required to have mechanically stable sheets as well as the homogeneity, density and flexibility of the resulting solid electrolyte films. Accordingly, they concluded that the ionic conductivity is affected by the quantity of binder to a greater or lesser extent, depending on the distribution pattern of the binder. In general, a lower weight fraction of a binder results in a higher ionic conductivity, since ionic pathways are increasingly restricted with binder content. However, it only applies when sufficient polymer as binder is present to ensure proper adhesion between the particles of solid electrolyte. Above all, Riphaus et al. focused only on slurry-based processing of sulfide-based composite electrolytes.

U.S. Pat. No. 9,300,011 B2 (Toyota Jidosha Kabushiki Kaisha) discloses a solid state electrolyte layer comprising a sulfide electrolyte material manufactured from $Li_2S$ and $P_2S_5$, having no more than 10 mol % of a bridging sulfur of an $S_3P—S—PS_3$ unit and a hydrophobic polymer as binder, in particular hydrocarbon-based polymer such as SBR or a styrene-ethylene-butadiene rubber (SEBR). Its purpose is to obtain a sulfide-based solid composite electrolyte in which an increase in resistance due to deterioration of the sulfide material is suppressed. Moreover, it also focuses on slurry-based processing of solid electrolytes only.

As such, the sulfide-based solid composite electrolytes of the state of the art are mostly produced by wet casting process, where the solid ionic conducting inorganic particles are disposed in a solution of binder and solvent so as to form a slurry which is subsequently cast on a support and then dried to remove the solvent. Usually, such a wet process requires a large amount of solvent to make a slurry so that the evaporation of solvent and recycling thereof eventually result in the complex processing and the considerable increase of manufacturing cost. On top of the problems, there's another difficulty in finding a solvent which is compatible with both sulfide materials and polymeric binders in a sulfide-based composite electrolyte.

Accordingly, the quest for a process to produce a sulfide-based composite electrolyte with minimum amount of solvent or even without the presence of solvent, has continuously existed in the field.

Inada et al. in *Solid State Ionics,* 158 (2003) 275-280 ("Fabrication and properties of composite solid-state electrolytes") prepared composite inorganic solid electrolytes comprising thio-LISICON (lithium germanium thio-phosphate, $Li_{3.25}Ge_{0.25}P_{0.75}S_4$) as ionic conducting inorganic particles and SBR copolymer as polymeric binder by dry and wet processes, and demonstrated that the composite inorganic solid electrolyte with SBR prepared by the dry process showed higher conductivity ($5.74 \cdot 10^{-4}$ $Scm^{-1}$) than the one made by the wet process ($0.35 \cdot 10^{-4}$ $Scm^{-1}$). Consequently, one conclusion is that the granular domain structure of the polymer formed during the dry process is more suitable to have higher ionic conduction. However, the dry process used in this literature has still disadvantages in mass production of large and thin solid electrolyte films required for batteries.

Fluorinated polymers such as vinylidene difluoride (VDF)-based polymers have been used as binders thanks to their good oxidative resistance and have been mostly applied in the cathode formulations in Li-ion batteries. Although some reports suggest the use of fluorinated binders for sulfide composites, typical fluorinated binders are difficult to be solubilized in solvents, which are compatible with sulfide materials.

Due to the insolubility, TFE polymers are typically processed as a paste at temperatures a few degrees above room temperature (35 to 55° C.) using techniques including calendaring and cold extrusion. By applying shear in calendaring and cold extrusion, TFE polymer particles are fibrillated to form a three-dimensional (3-D) structure consisting of nodes, fibrils interconnecting the nodes, and the free spaces between the fibrils and the nodes. Moreover, TFE polymer is compatible with sulfide-based solid ionic conducting inorganic particles and shows excellent resistance to oxidation in the solid composite electrolyte.

US Patent Publication No. 2014/0238576 A1 (Linda Zhong) describes a dry process for making an electrode, notably a cathode, by using the fibrillation feature of TFE polymer. However, this dry process among other solutions couldn't solve the problem of using a large quantity of the binder to support other particles to form an electrode film and to make a strong electrode with adequate density. Large quantity of the binder blocks the surface area of the active materials, further lowering the energy density of the battery, and moreover this may block the electrical flow among the active material particles. Accordingly, the resistance between particles increases and the energy density of the battery decreases. Consequently, a wet process for making an electrode, not a dry process, was finally claimed in US'576.

Recently, Hippauf et al. in *Energy Storage Materials* (available online as of May 24, 2019) ("Overcoming binder limitations of sheet-type solid-state cathodes using a solvent-free dry-film approach") demonstrated the production of solid state cathode through a dry process, replacing slurry-based binders with TFE polymer, while reducing the amount of binder to an absolute minimum. It is also described that they applied the same process to prepare a 'free-standing' solid electrolyte film with 0.30 wt % of the binder content. Although the low binder content assures high ionic conductivity, the mechanical properties of the obtained films would be too low to obtain a thin and free-standing film, and hence such films are difficult to be practically used. Moreover, Hippauf et al. didn't succeed in increasing the PTFE content above 1 wt % in their process, with a purpose to increase the mechanical properties of the resulting films, because this rendered the paste too stiff to be processed.

There's thus a continuous need in this field for a dry process for manufacturing a sulfide-based solid composite electrolyte film, which is thinner and free-standing, while maintaining high ionic conductivity and good mechanical properties together with the processability of the TFE polymer.

SUMMARY OF THE INVENTION

A first object of the present invention is to provide a process for manufacturing a free-standing solid composite electrolyte film, comprising the steps of a) mixing (i) at least one sulfide-based solid ionic conducting inorganic particle and (ii) at least one tetrafluoroethylene (TFE) polymer to form a paste, and b) calendaring or extruding the paste to produce a film, wherein the step a) mixing comprises a1) homogenizing the mixture of (i) at least one sulfide-based solid ionic conducting inorganic particle and (ii) at least one TFE polymer into powders, and a2) blending the powders into a paste.

A second object of the present invention is a free-standing solid composite electrolyte film comprising (i) at least one sulfide-based solid ionic conducting inorganic particle and (ii) at least one TFE polymer, wherein an amount of the (ii) at least one TFE polymer is from 1.0 to 20.0 wt %, preferably from 2.0 to 15.0 wt % and more preferably from 3.0 to 10.0 wt %, based on the total weight of the film.

A third object of the present invention is a solid state battery comprising the free-standing solid composite electrolyte film as described above.

A fourth object of the present invention is the use of the free-standing solid composite electrolyte film as described above, in a solid state battery for improving ionic conductivity and mechanical properties.

It was surprisingly found by the inventors that the process for manufacturing a free-standing solid composite electrolyte film according to the invention may provide a thin and free-standing film with good processability, without necessarily requiring the presence of solvent. In addition, the free-standing solid composite electrolyte film according to the present invention delivers a particularly advantageous combination of properties, e.g., excellent ionic conductivity and mechanical property.

BRIEF DESCRIPTION OF DRAWINGS

FIG. 1 is a cross-section of the pressure cell in AC impedance spectroscopy, developed within Solvay to measure the ionic conductivity of the film. In the pressure cell, the film is pressed between 2 stainless steel electrodes during impedance measurement.

DETAILED DESCRIPTION OF THE INVENTION

Definitions

Throughout this specification, unless the context requires otherwise, the word "comprise" or "include", or variations such as "comprises", "comprising", "includes", including" will be understood to imply the inclusion of a stated element or method step or group of elements or method steps, but not the exclusion of any other element or method step or group of elements or method steps. According to preferred embodiments, the word "comprise" and "include", and their variations mean "consist exclusively of".

As used in this specification, the singular forms "a", "an" and "the" include plural aspects unless the context clearly dictates otherwise. The term "and/or" includes the meanings "and", "or" and also all the other possible combinations of the elements connected to this term.

The term "between" should be understood as being inclusive of the limits.

As used herein, "alkyl" groups include saturated hydrocarbons having one or more carbon atoms, including straight-chain alkyl groups, such as methyl, ethyl, propyl, butyl, pentyl, hexyl, heptyl, octyl, nonyl, decyl, cyclic alkyl groups (or "cycloalkyl" or "alicyclic" or "carbocyclic" groups), such as cyclopropyl, cyclopentyl, cyclohexyl, cycloheptyl, and cyclooctyl, branched-chain alkyl groups, such as isopropyl, tert-butyl, sec-butyl, and isobutyl, and alkyl-substituted alkyl groups, such as alkyl-substituted cycloalkyl groups and cycloalkyl-substituted alkyl groups.

The term "aliphatic group" includes organic moieties characterized by straight or branched-chains, typically having between 1 and 18 carbon atoms. In complex structures, the chains may be branched, bridged, or cross-linked. Aliphatic groups include alkyl groups, alkenyl groups, and alkynyl groups.

As used herein, the terminology "(Cn-Cm)" in reference to an organic group, wherein n and m are integers, respectively, indicates that the group may contain from n carbon atoms to m carbon atoms per group.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a temperature range of about 120° C. to about 150° C. should be interpreted to include not only the explicitly recited limits of about 120° C. to about 150° C., but also to include sub-ranges, such as 125° C. to 145° C., 130° C. to 150° C., and so forth, as well as individual amounts, including fractional amounts, within the specified ranges, such as 122.2° C., 140.6° C., and 141.3° C., for example.

The constituents of the process for manufacturing a free-standing solid composite electrolyte film and the free-standing solid composite electrolyte film according to the present invention are described hereinafter in details. It is to be understood that both the foregoing general description and the following detailed description are exemplary and are intended to provide further explanation of the invention as claimed. Accordingly, various changes and modifications described herein will be apparent to those skilled in the art. Moreover, descriptions of well-known functions and constructions may be omitted for clarity and conciseness.

The present invention provides a process for manufacturing a free-standing solid composite electrolyte film, comprising the steps of a) mixing (i) at least one sulfide-based solid ionic conducting inorganic particle and (ii) at least one tetrafluoroethylene (TFE) (co)polymer to form a paste, and b) calendaring or extruding the paste to produce a film, wherein the step a) mixing comprises a1) homogenizing (i) at least one sulfide-based solid ionic conducting inorganic particle and (ii) at least one TFE (co)polymer into powders and a2) blending the powders into a paste.

In the present invention, the term "free-standing solid composite electrolyte film" refers to a composite film having lithium ionic conductivity which has a free-standing shape at room temperature without a support, and may be in the form of a foldable, flexible and self-standing film. The solid composite electrolyte film according to the present invention does neither flow to take on the shape of its container, nor does it expand to fill the entire volume available. On the other hand, the solid composite electrolyte film according to the present invention may be shaped in a variety of manner due to its flexibility and hence may accommodate a change in either volume or shape which may happen during charging and discharging of a lithium battery.

In the present invention, the term "paste" refers to a substance which is a dry or moist pseudo-plastic solid which does not flow, but can be molded into a variety of shapes when a sufficient stress is applied.

Sulfide-Based Solid Ionic Conducting Inorganic Particle

In the present invention, the term "sulfide-based solid ionic conducting inorganic particle" is not particularly limited as long as it is a solid electrolyte material containing sulfur atom(s) in the molecular structure or in the composition.

The sulfide-based solid ionic conducting inorganic particle preferably contains Li, X (with X being P, Si, Sn, Ge, Al, As or B) and S, to increase Li-ion conductivity.

The sulfide-based solid ionic conducting inorganic particle according to the present invention is more preferably selected from the group consisting of:

lithium tin phosphorus sulfide ("LSPS") materials, such as $Li_{10}SnP_2S_{12}$;

lithium phosphorus sulfide ("LPS") materials, such as glasses, crystalline or glass-ceramic of those of formula $(Li_2S)_x$—$(P_2S_5)_y$, wherein x+y=1 and 0≤x≤1, $Li_7P_3S_{11}$, $Li_7PS_6$, $Li_4P_2S_6$, $Li_{9.6}P_3S_{12}$ and $Li_3PS_4$;

doped LPS, such as $Li_2CuPS_4$, Li $Li_{1+2x}Zn_{1-x}PS_4$, wherein 0≤x≤1, $Li_{3.33}Mg_{0.33}P_2S_6$, and $Li_{4-3x}Sc_xP_2S_6$, wherein 0≤x≤1;

lithium phosphorus sulfide oxygen ("LPSO") materials of formula $Li_xP_yS_zO$, where 0.33≤x≤0.67, 0.07≤y≤0.2, 0.4≤z≤0.55;

lithium phosphorus sulfide materials including X ("LXPS"), wherein X is Si, Ge, Sn, As, or Al, such as $Li_{10}GeP_2S_{12}$ and $Li_{10}SiP_2S_{12}$;

lithium phosphorus sulfide oxygen including X ("LXPSO"), wherein X is Si, Ge, Sn, As, or Al;

lithium silicon sulfide ("LSS") materials;

lithium boron sulfide materials, such as $Li_3BS_3$ and $Li_2S$—$B_2S_3$—LiI;

lithium tin sulfide materials and lithium arsenide materials, such as $Li_{0.8}Sn_{0.8}S_2$, $Li_4SnS_4$, $Li_{3.833}Sn_{0.833}As_{0.166}S_4$, $Li_3AsS_4$—$Li_4SnS_4$, Ge-substituted $Li_3AsS_4$; and Argyrodite-type sulfide materials of formula $Li_6PS_5Y$, wherein Y is Cl, Br or I, the compounds being possibly deficient in sulfur, lithium or halogen, for instance $Li_{6-x}PS_{5-x}Cl_{1+x}$ with 0≤x≤0.5, or doped with a heteroatom.

Particularly preferred sulfide solid electrolytes are lithium tin phosphorus sulfide ("LSPS") materials (e.g., $Li_{10}SnP_2S_{12}$) and Argyrodite-type sulfide materials (e.g., $Li_6PS_5Cl$).

TFE (Co)Polymer

TFE (co)polymer according to the present invention is a TFE (tetrafluoroethylene) homopolymer, a TFE copolymer comprising recurring units of TFE monomer and recurring units different from TFE monomer, or blends thereof.

TFE copolymer according to the present invention is distinguished from a melt-processable TFE copolymer and is generally intended to denote a TFE polymer modified with a small amount of recurring units different from TFE monomer to the extent the resulting TFE copolymer maintains its inherent fibrillation property.

A useful measure to differentiate TFE copolymer according to the present invention from the melt-processable TFE copolymer is Amorphous Index (A.I.), as described notably by R. E. MOYNIHAN in *Journal American Chemical Society,* 1959, vol. 81, p. 1045-1050 ("The Molecular Structure of Perfluorocarbon Polymers: Infrared Studies on Polytetrafluoroethylene"). The ratio between the intensity of an IR absorption band centered at about 778 $cm^{-1}$ and the intensity of another IR absorption band centered at about 2367 $cm^{-1}$ has been shown to suitably and reliably correlate to the fraction of amorphous phase in a TFE copolymer. In other words, this IR intensity ratio has been found to be directly proportional to the polymer chain conformational disorder content.

TFE copolymer of the invention may comprise recurring units of TFE monomer and recurring units different from TFE monomer, such as recurring units derived from per (halo)fluoroolefin. A per(halo)fluoroolefin is an ethylenically unsaturated fluorinated olefin, free from hydrogen atoms and possibly comprising one or more than one halogen atoms different from fluorine, in particular chlorine or bromine. Preferably, per(halo)fluoroolefin monomer is a $C_3$-$C_8$ perfluoroolefin, such as hexafluoropropylene.

In a specific embodiment, TFE copolymer comprises recurring units derived from at least one per(halo)fluoroolefin different from TFE monomer, in an amount of from 0.01 to 0.25% moles, preferably from 0.05 to 0.175% moles, with respect to the total moles of the recurring units of the TFE copolymer.

In a preferred embodiment, the at least one per(halo) fluoroolefin different from TFE monomer is hexafluoropropylene.

In another specific embodiment, TFE copolymer comprises recurring units derived from at least one perfluoro (oxy)alkylvinylether of formula $CF_2$═CF—O—$R_f$, wherein $R_f$ is a $C_1$-$C_6$ perfluoroalkyl, which may comprise one or more ethereal oxygen atom(s), in an amount of 0.005 to 0.025% moles, with respect to the total moles of the recurring units of the TFE copolymer.

In another preferred embodiment, the at least one perfluoro(oxy)alkylvinylether is perfluoropropylvinylether.

In one embodiment, the (ii) at least one TFE (co)polymer has the A.I. defined as the ratio between intensity of the waveband centered at about 778 $cm^{-1}$ and intensity of the waveband centered at about 2367 $cm^{-1}$, as determined by infrared spectroscopy, not more than 0.22, preferably not more than 0.017, and more preferably not more than 0.012.

In practice, a compressed tablet of TFE copolymer, made in a press under about 10 tons pressure, is submitted to FT-IR analysis using a spectrophotometer, having a spectral range of 4000 to 400 $cm^{-1}$. Optical density or intensity of the absorption band centred on about 778 $cm^{-1}$ ($OD_{778}$) is determined and normalized over the optical density of the complex band centred on 2367 $cm^{-1}$ ($OD_{2367}$). A.I is thus determined as follows:

$$A.I=(OD_{778})/(OD_{2367}).$$

Among suitable recurring units as comonomers within TFE copolymer, mention can be made of:

$C_3$-$C_8$ perfluoroolefin, e.g. hexafluoropropylene (HFP) and hexafluoroiso-butene;

perfluoroalkylvinylether of formula $CF_2$═CF—O—$R_f$, wherein $R_f$ is a $C_1$-$C_3$ perfluoroalkyl, e.g., —$CF_3$, —$C_2F_5$, or —$C_3F_7$, namely, perfluoromethylvinylether (of formula $CF_2$═$CFOCF_3$), perfluoroethylvinylether (of formula $CF_2$═$CFOC_2F_5$), perfluoropropylvinylether (of formula $CF_2$═$CFOC_3F_7$), and mixtures thereof;

perfluoro(oxy)alkylvinylether of formula $CF_2$═CF—O—X, wherein X is a $C_{12}$ perfluoro(oxy)alkyl having one or more ether groups, e.g., perfluoromethoxy vinylether of formula $CF_2$═CF—O—$CF_2$—O—$R_{f1}$, wherein $R_{f1}$ is a linear or branched $C_1$-$C_6$ perfluoroalkyl group, cyclic $C_5$-$C_6$ perfluoroalkyl group, a linear or branched $C_2$-$C_6$ perfluoroxyalkyl group, preferably, $R_{f1}$ is —$CF_3$, —$CF_2CF_3$, or —$CF_2CF_2OCF_3$, e.g., perfluoropropylvinylether; and perfluorodioxoles having the following formula:

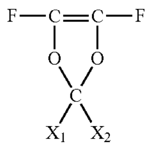

wherein $X_1$ and $X_2$, equal to or different from each other, are selected between F and $CF_3$, preferably F.

TFE (co)polymer according to the present invention possesses two transition temperatures at about 19° C. and 30° C. Below 19° C., TFE (co)polymer particles easily slide past each other, while maintaining its identity. Above 19° C., however, the structure of TFE (co)polymer particles becomes looser and more sensitive to mechanical shear, especially above its transition temperature of 19° C. Accordingly, shearing may unwind the crystalline structure of TFE polymer, initiating so-called fibrillation phenomenon, i.e., creating a 3-D structure consisting of nodes, fibrils interconnecting the nodes, and the free spaces between the fibrils and the nodes. Fibrillation occurs when particles rub against a surface and the fibrils are pulled out of the surface of TFE (co)polymeric particles. At temperatures higher than 30° C., a higher degree of fibrillation continues.

In a specific embodiment, the a1) homogenizing is performed at a temperature of 19° C. or lower, preferably between 10° C. and 19° C.

In another specific embodiment, the a2) blending is performed at a temperature of 30° C. or higher, preferably between 30° C. and 150° C., more preferably between 35° C. and 120° C., and even more preferably between 40° C. and 80° C.

In one embodiment, the step b) calendaring or extruding is performed at a temperature between 30° C. and 150° C., preferably between 35° C. and 120° C., and more preferably between 40° C. and 100° C.

In the present invention, (iii) at least one lubricant may be additionally present in the step a) to form a paste. Examples of the (iii) at least one lubricant include, but not limited to, aliphatic hydrocarbons, particularly isoparaffinic hydrocarbon compounds and petroleum fractions, and more particularly squalene. Preferred petroleum fractions are gasoline ($C_4$-$C_{10}$), naphtha ($C_4$-$C_{11}$) and kerosene/paraffin ($C_{10}$-$C_{16}$), and mixtures thereof.

In a preferred embodiment, the (iii) at least one lubricant is selected from the group consisting of isoparaffinic hydrocarbon compounds and petroleum fractions.

In a more preferred embodiment, the (iii) at least one lubricant is squalene.

According to one embodiment, an amount of the (iii) at least one lubricant is from 5.0 to 35.0 parts by weight (pbw), preferably from 10.0 to 30.0 pbw and more preferably from 15.0 to 25.0 pbw, with respect to the total weight of the mixture of (i) at least one sulfide-based solid ionic conducting inorganic particle, (ii) at least one TFE (co)polymer and (iii) at least one lubricant.

A second object of the present invention is a free-standing solid composite electrolyte film comprising (i) at least one sulfide-based solid ionic conducting inorganic particle and (ii) at least one TFE (co)polymer, wherein an amount of the (ii) at least one TFE (co)polymer is from 1.0 to 20.0 wt %, preferably from 2.0 to 15.0 wt % and more preferably from 3.0 to 10.0 wt %, based on the total weight of the film.

In one embodiment, (ii) at least one TFE (co)polymer has a three-dimensional (3-D) structure consisting of nodes, fibrils interconnecting the nodes, and the free spaces between the fibrils and the nodes, and the (i) at least one sulfide-based solid ionic conducting inorganic particle is positioned inside the free spaces in the free-standing solid composite electrolyte film according to the present invention.

In a specific embodiment, the thickness of the free-standing solid composite electrolyte film according to the present invention is from 10 to 150 μm, preferably from 15 to 100 μm, and more preferably from 20 to 60 μm.

A third object of the invention pertains to a solid state battery comprising the free-standing solid composite electrolyte film of the present invention as above detailed. The solid state battery of the invention includes a positive electrode and a negative electrode.

Still another object of the invention is the use of the free-standing solid composite electrolyte film as described above, in a solid state battery for improving ionic conductivity and mechanical properties.

Should the disclosure of any patents, patent applications, and publications which are incorporated herein by reference conflict with the description of the present application to the extent that it may render a term unclear, the present description shall take precedence.

The invention will be now explained in more details with reference to the following examples, whose purpose is merely illustrative and not intended to limit the scope of the invention.

EXAMPLES

Raw Materials

Sulfide-based solid inorganic particles:

- LSPS ($Li_{10}SnP_2S_{12}$) (NANOMYTE® SSE-10), commercially available from NEI Corporation
- LPSCl ($Li_6PS_5Cl$), commercially available from NEI Corporation TFE (co)polymer: Algoflon® DF 132 F (TFE homopolymer) and Algoflon® DF 681F (TFE copolymer) (both available from Solvay Specialty Polymers Italy S.p.A)

SEBS: Tuftec™ N504 (available from Asahi Kasei Chemicals Corporation)

Lubricant: Squalene (available from Sigma Aldrich) and Isopar™ K (available from ExxonMobil Chemical)

Ionic Conductivity

The ionic conductivity of the films were measured by AC impedance spectroscopy with an in-house developed pressure cell, where the film is pressed between two stainless steel electrodes during impedance measurements. A cross section of the pressure cell is shown in FIG. 1.

The impedance spectra of the solid composite electrolyte according to Example 1 were determined at a pressure of 83 MPa and at a temperature of 20° C.

The resistance R of the solid composite electrolyte film was obtained by extrapolating (with a linear model) the quasi-linear part of the low frequency diffusion tail of the impedance spectra. The Resistance R was taken where the extrapolated curve crosses the X axis. Accordingly, the ionic conductivity a was obtained using the equation of $\sigma=d/(R\times A)$, wherein d is the thickness of the film and A is the area of the stainless steel electrode.

The SI unit of ionic conductivity is siemens per meter (S/m), wherein S is $ohm^{-1}$.

Mechanical Property

Mechanical property was assessed with the naked eyes in a manner, i.e., whether a film is i) self-standing without any support, ii) flexible, meaning that it can be repeatedly bended without breaking or crack formation, and iii) mechanically resistant to deformation. It means that it should be able to resist the physical stress of a pressing/calendaring step during which the thickness and/or porosity of the film is reduced and that it should be compatible with a roll-to-roll or stacking process.

Comparative Example 1 (Comp. Ex 1)

3 g (99.85 wt %) of LSPS and 4.5 mg (0.15 wt %) of Algoflon® DF 132 F were homogenized into powders at 15°

C. and blended into a paste at 60° C. Due to the low amount of TFE polymer, it was very difficult to obtain a paste. In addition, the obtained paste was very fragile and very difficult to manipulate. Accordingly, the tensile strength of the paste was too low to be calendared so as to produce thin film, hindering the industrialization of the process and the practical use of the resulting composite electrolyte film.

Comparative Example 2 (Comp. Ex 2)

Comp. Ex 2 was prepared in the same way as Comp. Ex 1 with the only difference in the amount of LSPS (3 g, 99.7 wt %) and Algoflon® DF 132 F (9 mg, 0.30 wt %). Due to the low amount of TFE polymer, it was difficult to obtain a paste. In addition, the obtained paste was very fragile and difficult to manipulate. Accordingly, the tensile strength of the paste was too low to be calendared so as to produce a thin film, hindering the industrialization of the process and the practical use of the resulting composite electrolyte film.

Comparative Example 3 (Comp. Ex 3)

Comp. Ex 3 was prepared in the same way as Comp. Ex 1, except that LPSCl was used instead of LSPS. Accordingly, the amount of LPSCl and TFE polymer was adjusted, i.e., 3 g (99.7 wt %) of LPSCl and 9 mg (0.30 wt %) of Algoflon® DF 132 F.

Comparative Example 4 (Comp. Ex 4)

0.1 g (3 wt %) of SEBS was dissolved in 2.5 g of xylene to produce a polymer solution. 3.233 g (97 wt %) of LSPS was added to the polymer solution. The resulting slurry solution was cast on a Teflon support and dried at 50° C. Complete solvent removal was assured by vacuum drying at 80° C. A free-standing film was obtained.

Comparative Examples 5-9 (Comp. Ex 5-9)

Comp. Ex 5-9 were prepared in the same way as Comp. Ex 4, with the only difference in the amount of LSPS and SEBS. The compositions were mentioned in the below Table 1, together with the ionic conductivity and mechanical properties

TABLE 1

| | Sulfide (wt %) | Polymer (wt %) | Conductivity (mS/cm) | Mechanical Property & Processability |
|---|---|---|---|---|
| Comp Ex 1 | LSPS (99.85) | Algoflon ® DF 132 F (0.15) | 1.52 | Very difficult to manipulate. Too low tensile strength to be calendared. |
| Comp. Ex 2 | LSPS (99.7) | Algoflon ® DF 132 F (0.30) | 1.29 | Very difficult to manipulate. Too low tensile strength to be calendared. |
| Comp. Ex 3 | LPSCl (99.7) | Algoflon ® DF 132 F (0.30) | 1.36 | Very difficult to manipulate. Too low tensile strength to be calendared. |
| Comp. Ex 4 | LSPS (97.0) | SEBS (3.0) | 0.39 | Good tensile strength. Easy to obtain a free-standing film. |
| Comp. Ex 5 | LSPS (98.0) | SEBS (2.0) | 0.49 | Difficult to manipulate. Not all particles well bonded |
| Comp. Ex 6 | LSPS (99.0) | SEBS (1.0) | 0.67 | Difficult to manipulate. Not all particles well bonded |
| Comp. Ex 7 | LSPS (96.0) | SEBS (4.0) | 0.23 | Excellent tensile strength. Easy to obtain a free-standing film. |
| Comp. Ex 8 | LSPS (95.0) | SEBS (5.0) | 0.19 | Excellent tensile strength. Easy to obtain a free-standing film. |
| Comp. Ex 9 | LSPS (90.0) | SEBS (10.0) | 0.06 | Excellent tensile strength. Easy to obtain a free-standing film. |

Example 1 (Ex 1)

3.0 g (99.0 wt %) of LSPS and 30 mg (1.0 wt %) of Algoflon® DF 132 F were homogenized into powders at 15° C. and blended into a paste at 60° C. The resulting paste was calendared at 40° C. to form a free-standing film. Thusly-obtained film didn't show excellent tensile strength, but enough to be further calendared to produce a thin film of 30 μm.

Examples 2-7 (Ex 2-7)

Ex 2-7 were prepared in the same way as Ex 1 except that the amount of LSPS and Algoflon® DF 132 F were varied to cover the content of TFE polymer from 1.0 to 20.0 wt %. Thusly-obtained free-standing films, respectively from Ex 2-7, showed good tensile strength and hence could be easily calendared in order to reduce the thickness to 30 μm.

As soon as the content of TFE polymer reached 3.0 wt % (Ex 2), significant improvement of the mechanical properties was observed. When TFE polymer content were 10.0 wt % (Ex 5), the paste became stiffer and hence more shear was required so as to calendar the paste into a thin film. Accordingly, it was expected that if the TFE polymer content exceeds 10.0 wt %, the resulting paste would become much stiffer and significant force would be required for calendaring.

As the content of TFE polymer increased up to 10.0 wt %, the ionic conductivity of the resulting film continued to decrease. More precisely, up to 10.0 wt % (Ex 5), excellent ionic conductivity was maintained at level of 0.3 mS/cm or higher. When the content of TFE polymer became even higher (Ex6 and Ex7), however, certain sign of charge transfer resistance appeared in the corresponding impedance curve. Nevertheless, the ionic conductivity wasn't dramatically reduced. At 20.0 wt % of TFE polymer (Ex 7), the resulting composite electrolyte film still showed an ionic conductivity of about 0.1 mS/cm.

Examples 8-13 (Ex 8-13)

Ex 8-13 were prepared in the same way as Ex 2-7 except that LPSCl was used instead of LSPS. Accordingly, the amount of LPSCl and TFE polymer was adjusted. Thusly-obtained free-standing films, respectively from Ex 8-13, showed good tensile strength and hence could be easily calendared in order to reduce the thickness to 30 μm.

Example 14 (Ex 14)

3 g (95.0 wt %) of LSPS and 0.16 g (5 wt %) of TFE polymer were homogenized into powders at 15° C. Subsequently, 0.89 g (22 pbw with respect to the total weight of the mixture of LSPS, TFE polymer and squalene) of squalene was blended together with the powders to form a paste at 60° C. The resulting paste was calendared at 40° C. into a free-standing film and then squalene was removed by vacuum drying.

Example 15 (Ex 15)

Ex 15 was prepared in the same way as Ex 14 except that LPSCl was used instead of LSPS.

Example 16 (Ex 16)

3 g (95.0 wt %) of LSPS and 0.16 g (5 wt %) of TFE polymer were homogenized into powders at 15° C. Subsequently, 1.7 g (35 pbw with respect to the total weight of the mixture of LSPS, TFE polymer and Isopar™ K) of Isopar™ K was blended together with the powders to form a paste at 60° C. The resulting paste was calendared at 40° C. into a free-standing film and then Isopar™ K was removed by vacuum drying.

Addition of the lubricant facilitated the fibrillation so that the obtained free-standing film had excellent flexibility and good tensile strength. Compared to the films produced without lubricant (Ex 3 and Ex 9 comprising both 5.0 wt % of TFE polymer), no substantial change in ionic conductivity was observed.

Examples 17-18 (Ex 17-18)

Ex 17-18 were prepared in the same way as Ex 2-3 except that Algoflon® DF 681 F was used instead of Algoflon® DF 132 F. Thusly-obtained free-standing film showed good tensile strength and hence could be easily calendared in order to reduce the thickness to 30 μm.

All the compositions of the resulting composite films of Ex 1-18 are mentioned in the below Table 2, together with the ionic conductivity and mechanical properties.

TABLE 2

| | Sulfide (wt %) | TFE polymer (wt %) | Lubricant (pbw*) | Conductivity (mS/cm) | Mechanical Property & Processability |
|---|---|---|---|---|---|
| Ex 1 | LSPS (99.0) | Algoflon ® DF 132 F (1.0) | — | 1.12 | Low tensile strength. Easy to obtain a free-standing film. |
| Ex 2 | LSPS (97.0) | Algoflon ® DF 132 F (3.0) | — | 0.62 | Good tensile strength. Easy to obtain a free-standing film. |
| Ex 3 | LSPS (95.0) | Algoflon ® DF 132 F (5.0) | — | 0.51 | Excellent tensile strength. Easy to obtain a free-standing film. |
| Ex 4 | LSPS (92.5) | Algoflon ® DF 132 F (7.5) | — | 0.46 | Excellent tensile strength. Easy to obtain a free-standing film. |
| Ex 5 | LSPS (90.0) | Algoflon ® DF 132 F (10.0) | — | 0.26 | Excellent tensile strength, but paste became stiffer so that significant force was applied to obtain a free-standing film. |
| Ex 6 | LSPS (85.0) | Algoflon ® DF 132 F (15.0) | — | 0.06 | Excellent tensile strength, but paste became quite stiff that significant force was required to obtain a free-standing film. |
| Ex 7 | LSPS (80.0) | Algoflon ® DF 132 F (20.0) | — | 0.07 | Excellent tensile strength, but paste became quite stiff that significant force was required to obtain a free-standing film. |
| Ex 8 | LPSCl (97.0) | Algoflon ® DF 132 F (3.0) | — | 0.97 | Low tensile strength. Easy to obtain a free-standing film. |
| Ex 9 | LPSCl (95.0) | Algoflon ® DF 132 F (5.0) | — | 0.75 | Good tensile strength. Easy to obtain a free-standing film. |
| Ex 10 | LPSCl (92.5) | Algoflon ® DF 132 F (7.5) | — | 0.45 | Excellent tensile strength. Easy to obtain a free-standing film. |
| Ex 11 | LPSCl (90.0) | Algoflon ® DF 132 F (10.0) | — | 0.32 | Excellent tensile strength, but paste became stiffer so that more force was applied to obtain a free-standing film. |
| Ex 12 | LPSCl (85.0) | Algoflon ® DF 132 F (15.0) | — | 0.15 | Excellent tensile strength, but paste became quite stiff that significant force was required to obtain a free-standing film |
| Ex 13 | LPSCl (80.0) | Algoflon ® DF 132 F (20.0) | — | 0.09 | Excellent tensile strength, but paste became quite stiff that significant force was required to obtain a free-standing film |
| Ex 14 | LSPS (95.0) | Algoflon ® DF 132 F (5.0) | Squalene (22 pbw) | 0.53 | Same as Ex 3, but the process became faster/easier. |
| Ex 15 | LPSCl (95.0) | Algoflon ® DF 132 F (5.0) | Squalene (22 pbw) | 0.69 | Same as Ex 9, but the process became faster/easier. |
| Ex 16 | LSPS (95.0) | Algoflon ® DF 132 F (5.0) | Isopar K (35 pbw) | 0.46 | Same as Ex 3, but the process became faster/easier. |
| Ex 17 | LSPS (97.0) | Algoflon ® DF 681 F | — | 0.78 | Same as Ex 2 |

TABLE 2-continued

| | Sulfide (wt %) | TFE polymer (wt %) | Lubricant (pbw*) | Conductivity (mS/cm) | Mechanical Property & Processability |
|---|---|---|---|---|---|
| | | (3.0) | | | |
| Ex 18 | LSPS (95.0) | Algoflon ® DF 681 F (5.0) | — | 0.67 | Same as Ex 3 |

All experiments were carried out under protected environment (Ar).

The invention claimed is:

1. A process for manufacturing a free-standing solid composite electrolyte film, comprising the steps of:

a) mixing (i) at least one sulfide-based solid ionic conducting inorganic particle and (ii) at least one tetrafluoroethylene (TFE) (co)polymer to form a paste, wherein the at least one (TFE) (co)polymer has an Amorphous Index (A.I.) not more than 0.22 and wherein an amount of the (ii) at least one TFE (co)polymer is from 1.0 to 7.5 wt % based on a total weight of the film; and b) calendaring or extruding the paste to produce a film, wherein the step a) mixing comprises a1) homogenizing the (i) at least one sulfide-based solid ionic conducting inorganic particle and (ii) at least one TFE (co)polymer into powders and a2) blending the powders into a paste, wherein the a1) homogenizing is performed at a temperature of 19° C. or lower and the a2) blending is performed at a temperature of 30° C. or higher, and wherein the step b) calendaring or extruding is performed at a temperature between 30° C. and 150° C.

2. The process according to claim 1, further comprising a step of adding (iii) at least one lubricant in a2) blending to form a paste.

3. The process according to claim 2, additionally comprising a step of c) drying the film obtained from the step b) to remove the lubricant.

4. The process according to claim 2, wherein the (iii) at least one lubricant is selected from the group consisting of isoparaffinic hydrocarbon compounds and petroleum fractions.

5. The process according to claim 2, wherein an amount of (iii) at least one lubricant is from 5.0 to 35.0 parts by weight (pbw), with respect to the total weight of the mixture of (i) at least one sulfide-based solid ionic conducting inorganic particle, (ii) at least one TFE (co)polymer and (iii) at least one lubricant.

6. The process according to claim 1, further comprising an additional step of d) calendaring.

7. The process according to claim 1, wherein the (ii) at least one TFE (co)polymer is selected from the group consisting of (a) a TFE homopolymer; (b) a TFE copolymer comprising from 0.01 to 25% moles, with respect to the total moles of the recurring units of the TFE copolymer, of recurring units derived from at least one per(halo)fluoroolefin different from TFE; and (c) blends thereof.

8. The process according to claim 7, wherein the at least one per(halo)fluoroolefin different from the TFE is hexafluoropropylene.

9. The process according to claim 1, wherein the (i) at least one sulfide-based solid ionic conducting inorganic particle comprises crystalline, glass-ceramic and glassed $Li_3PS_4$, $Li_7P_3S_{11}$, $Li_7PS_6$, $Li_{9.6}P_3S_{12}$, $Li_4P_2S_6$ and other glasses in the system of $Li_2S—P_2S_5$, Argyrodite-type $Li_6PS_5X$ (X=Cl, Br, or I), $(Li_2S)_x—(P_2S_5)_y$, wherein x+y=$_1$ and 0≤x≤1, $Li_{10}SnP_2S_{12}$, $Li_{10}GeP_2S_{12}$, $Li_{10}SiP_2S_{12}$, $Li_{0.8}Sn_{0.8}S_2$, $Li_2S—P_2S_5—SiS_2$, $Li_2S—P_2S_5—SiS_2—LiCl$, $Li_2S—P_2S_5—SnS$, $Li_2S—SiS_2—P_2S_5$, $Li_2S—SiS_2—P_2S_5—LiI$, $Li_2S—SiS_2—LiI$, $Li_2S—SiS_2$, $Li_{9.54}Si_{1.74}P_{1.44}S_{11.7}Cl_{0.3}$, doped Li—P—S, doped Li—P—S—X, $Li_2CuPS_4$, $Li_{1+2x}Zn_{1-x}PS_4$, wherein 0≤x≤1, $Li_{3.33}Mg_{0.33}P_2S_6$, $Li_{4-3x}Sc_xP_2S_6$, wherein 0x≤1, $Li_2S—GeS_2—ZnS$, $Li_2S—SiS_2—Al_2S_3$, $Li_3SbS_4$, Ge-substituted $Li_3AsS_4$, $Li_{3.833}Sn_{0.833}As_{0.166}S_4$, $Li_3AsS_4—Li_4SnS_4$, $Na_3PS_4$, $Na_{10}SnP_{12}S_{12}$, $Na_{11}Sn_2PS_{12}$, oxysulfides thereof, and blends thereof.

* * * * *